United States Patent [19]
Hilsum

[11] 4,139,261
[45] Feb. 13, 1979

[54] DISPLAY PANEL CONSTRUCTIONS ELIMINATING DISCONTINUITIES BETWEEN ADJACENT PANELS

[75] Inventor: Cyril Hilsum, Malvern, England

[73] Assignee: The Secretary of State for Defence in Her Britannic Majesty's Government of the United Kingdom of Great Britain and Nothern Ireland, London, England

[21] Appl. No.: 762,702

[22] Filed: Jan. 26, 1977

[30] Foreign Application Priority Data
Jan. 26, 1976 [GB] United Kingdom ............... 2948/76

[51] Int. Cl.² .................. G02B 5/17; G09F 13/20
[52] U.S. Cl. .................. 350/96.27; 40/544; 40/547; 313/494; 313/505; 340/166 EL
[58] Field of Search .......... 350/96 R, 96 B, 96 BC, 350/169, 96.27, 96.26; 313/494, 505, 507; 340/166 EL; 40/130 R, 130 F, 130 H, 130 M, 541–547

[56] References Cited

U.S. PATENT DOCUMENTS

| | | | |
|---|---|---|---|
| 2,967,248 | 1/1961 | Nicoll | 350/96 B X |
| 3,669,789 | 6/1972 | Utsugi et al. | 350/96 R X |
| 3,685,186 | 8/1972 | Goodman | 40/130 R X |
| 3,694,902 | 10/1972 | Apgar et al. | 350/96 R UX |
| 3,869,646 | 3/1975 | Kirton et al. | 315/246 |
| 3,904,924 | 9/1975 | Hilsum et al. | 313/505 X |
| 3,936,816 | 2/1976 | Murata | 313/505 X |
| 3,987,299 | 10/1976 | Mulder | 350/169 X |
| 4,033,687 | 7/1977 | Hirayama et al. | 350/96 R X |

FOREIGN PATENT DOCUMENTS 1512126  4/1970  Fed. Rep. of Germany ......... 350/96 B

OTHER PUBLICATIONS

Nicoll, "Mural Television Display Using Fiber Optics," *RCA Technical Notes*, RCA TN No. 188, Sep. 1958.

*Primary Examiner*—John K. Corbin
*Assistant Examiner*—John D. Lee
*Attorney, Agent, or Firm*—Pollock, Vande Sande and Priddy

[57] ABSTRACT

A display comprises a plurality of addressable display panels each having a display zone for displaying visual information and arranged in a formation so as to collectively provide a composite display of increased area. A fibre optic image transform construction is arranged in front of the display panels for transforming an image collectively provided by the panels into a corresponding continuous image in which discontinuity between adjacent panel display zones is eliminated.

8 Claims, 5 Drawing Figures

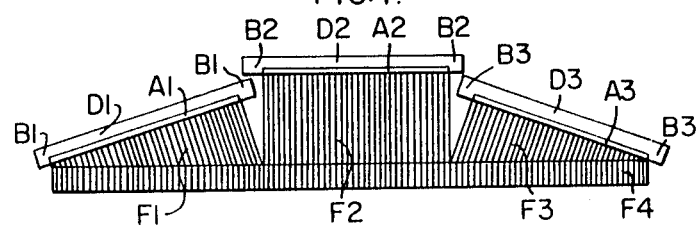
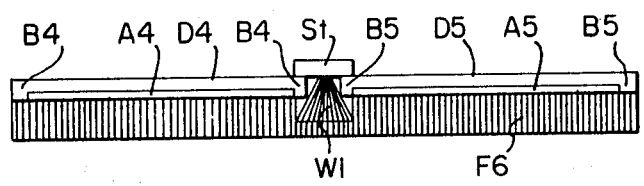
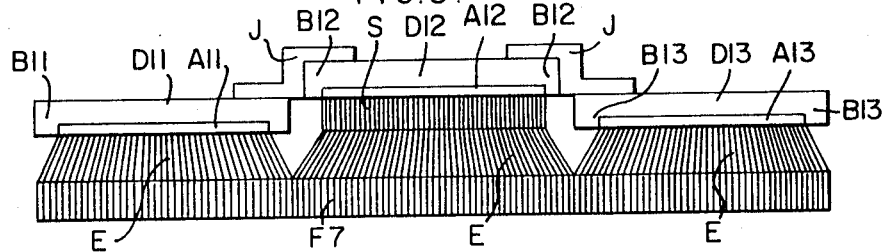
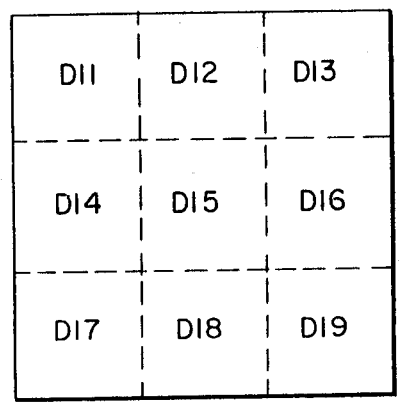
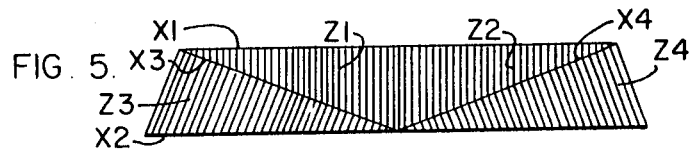

DISPLAY PANEL CONSTRUCTIONS ELIMINATING DISCONTINUITIES BETWEEN ADJACENT PANELS

The present invention relates to display panel constructions. Some display panels such as those which are electronically operated, e.g. electroluminescent display panels, are difficult and expensive to make in a large area form. Also they tend to become more fragile as their size is increased. This is unfortunate since if such panels are damaged their replacement or repair is expensive.

According to the present invention a display panel construction includes a plurality of display panels each having a display zone for displaying visual information, the panels being arranged in a formation so as to provide collectively a composite display of increased area, and arranged in front of the panel formation a fibre-optic image transform construction for transforming an observed image of the panel formation into a corresponding image in which discontinuity between adjacent display zones is reduced in size relative to the display zones.

When a single panel is extremely difficult and costly to make, as for example in the case of an electroluminescent panel having a display area greater than about 0.1m$^2$, a composite display made according to the invention provides a potentially simple and cheap alternative.

Furthermore by using the composite display, parts of the display ie individual panels, instead of the whole display, may be repaired or replaced when necessary.

Most display panels have around their display zone some form of border or 'dead space.' For instance all electronically operated display panels need such a border for encapsulation of the display zone and to make space for the electrical connections which energize the display zone. The purpose of the fibre-optic transform construction is to hide the borders (and, if the panels are not touching, also the spaces) between adjacent display panels to provide a continuous display.

The fibre-optic transform construction preferably includes a plurality of fibre-optic members at least one of which is a fibre-optic plate and at least one of which serves to expand the displayed image in area or to contract the panel borders in area when viewed through the plate.

The display panels may be of any of the following known kinds; electroluminescent, liquid crystal, electrochromic, electrophoretic or plasma discharge. Each panel is electrically electrically addressable, and typically comprises a bordered periphery, an addressable display zone within that periphery, an electrically responsive medium in the form of a layer filling the display zone, first and second sets of electrode structures respectively on opposite sides of the layer, cooperative with one another, and defining a multiplicity of electrically addressable display elements within the display zone, and connector means disposed about the periphery and cooperative with the sets of electrode structures for applying electrical address controls to selected elements for defining visual information.

Embodiments of the present invention will now be described by way of example with reference to the accompanying drawings, in which:

FIGS. 1 to 3 are plan views of alternative display panel constructions.

FIG. 4 is a front view of the construction shown in FIG. 3.

FIG. 5 is a cross-sectional view of a fibre-optic wedge composite.

In the construction shown in FIG. 1 three display panels D1, D2 and D3 have active display zones, A1, A2 and A3 respectively which may be energized or addressed electrically to display visual information, eg words, numerals, symbols or analogue data. Examples of suitable panels, constructed in the manner referred to above, are described in U.S. Pat. Nos. 3,869,646 and 3,904,924. The panels D1, D2 and D3 have borders B1, B2 and B3 around their display zones A1, A2 and A3 respectively. The panels D1, D2 and D3 are arranged close together in an arced format to face a fibre-optic plate F4 parallel to the panel D2. The plate F4 has fibre-optic guide elements (represented by the closely spaced lines) which run perpendicular to its faces and parallel to one another. The display zones A1, A2 and A3 are optically coupled to the plate F4 by fibre optic plates F1, F2 and F3 respectively which are shaped to fit the spaces between the display zones A1, A2 and A3 and the plate F4. The plates F1, F2 and F3 are made from conventional fibre-optic block or plates as described below. The plates F1, F2 and F3 have guide elements which run parallel to one another and perpendicular to the respective display zones, A1, A2 and A3. The plate F2 has two parallel faces. However the plates F1 and F3 are both sliced in the form of a wedge. The adjacent edges of the plates F1 and F2 and of the plates F2 and F3 are arranged to meet where they touch the plate F4. No coupling exists between the plate F4 and the inner borders (the border B2 and the parts of the borders B1 and B3 adjacent to the border B2).

During operation a visual image is displayed by the adjacent panel display zones A1, A2 and A3 but not by the borders B1, B2 and B3. Light which constitutes this image is conducted to the plate F4 via the plates F1, F2 and F3. If the front of the plate F4 is observed, the image displayed by the zones A1, A2 and A3 is seen as a continuous image, i.e., one without inner borders, since the plates F1 and F3 effectively expand the area of the image and their coincidence with the plate F2 hides the inner borders. Accordingly, in the image on the front of the plate F4 the border discontinuity between adjacent panel display zones is substantially eliminated.

In the alternative construction shown in FIG. 2 two display panels D4, D5 having display zones A4, A5 and borders B4, B5 respectively are arranged parallel and side by side and are joined together by a display panel in the form of a strip St. Positioned in front of the panels D4, D5 is a single parallel faced fibre-optic plate F6 having fibre-optic guide elements running perpendicular to its faces and parallel to one another. The plate F6 has a recess between the zones A4 and A5 which accommodates a fibre-optic trapezoidal wedge whose smallest face touches the display zone of the strip St. The wedge W1 has fibre-optic guide elements which converge towards this face so that in operation an image of reduced scale provided by strip St is expanded by the wedge W1 to collectively provide in cooperation with the remainder of the plate F6, a continuous image.

In the construction shown in FIGS. 3 and 4 nine display panels D11 ... D19 (D11, 12 and 13 only shown in FIG. 3) having display zones A11 ... A19 and borders B11 ... B19 are joined together in a 3 × 3 square matrix by joining members J. The odd-numbered panels, eg D11, are stepped forward from the even numbered panels, eg D12, and the spaces in front of the even numbered panels accommodate spacer plates in a chess-board fashion. The plates S are located in front of the even-numbered display zones but not the even-numbered borders. The plates S have parallel faces and fibre-optic guide elements running parallel to one another and perpendicular to the faces. A single parallel faced fibre optic plate F7 having parallel running fibre-optic guide elements perpendicular to its faces is located in front of and parallel to the panels D11 ... D19. Each of the odd-numbered display zones and similarly each of the spacer plates S is coupled to the plate F7 by an expander plate E. Each expander plate E has a trapezoidal cross-section and fibre-optic guide elements which converge towards the smaller of its two parallel faces. The expander plates E are arranged so that they touch one another at the plate F7.

During operation an image is displayed by the display zones A11 ... A19. Light in the form of the image is conducted to the plate F7 by the spacer plates S in the case of even-numbered display zones and by the expander plates E. If the construction is observed from in front of the plate F7 the nine display zones A11 ... A19 are seen joined together without borders since the expander plates E effectively expand the parts of displayed image produced by the individual panels and cause the expanded images to be matched directly together to provide a continuous image on plate F7.

The spaces between the expander plates E and the spacer plates S may be filled with a suitable adhesive material, eg reinforced epoxy resin (not shown).

Typical surface dimensions for the panels D11 ... D19 are 15" (0.381m) × 10" (0.254m) and for the display zones A11 ... A19 14" (0.356m) × 9" (0.229m) giving borders B11 ... B19 of 1" (0.0254m). Thus each expander plate E is required to expand a plane typically 14" × 9" into one 15" × 10".

In an alternative embodiment of the invention the construction may be as shown in FIGS. 3 and 4 but the expander plates E may be replaced by expander plates having the same overall shape as those shown in FIGS. 3 and 4 but cut and made up as composites from fibre-optic blocks having parallel running guide elements. One possible cross-section of such a composite is shown in FIG. 5. The cross-section has two right angled wedge shaped zones Z1, Z2 which are arranged back-to-back so that the right angles are adjacent whereby the zones Z1, Z2 together define one major face labelled X1 of the expander. The guides of elements of the zones Z1, Z2 run perpendicular to this face. The other major face of the expander labelled X2 is defined by the hypotenuses of two further right-angled wedge shaped zones Z3, Z4 shaped to fit against the sloping faces labelled X3 and X4 respectively of the zones Z1, Z2. The guide elements of the zones Z3 and Z4 run perpendicular to the faces X3, X4, ie at an angle to the faces X1 and X2.

The overall square shape of the expander in the dimension perpendicular to the drawing in FIG. 5 may be provided by an arrangement of radially disposed wedges (not shown) each having a cross-section as shown in FIG. 5 and together defining a square.

Fibre-optic plates and blocks are known per se. They usually consist of bundles of thin glass or plastic fibres (the fibre-optic guides) suspended within a solid glass or plastic body and cut to a desired shape, e.g. a wedge.

The diameter of the fibre optic guides may be about the same size as a display element on the display in which case each fibre must be aligned with each display element for maximum resolution. Alternatively the fibre diameter can be about 1/6 the display element size when no alignment is necessary.

I claim:

1. A display of comparatively large size comprising a plurality of self-contained individual electrically addressable display panels each having a display zone for displaying visual information and arranged in a formation so as to collectively provide a composite display of increased area, the display zone of each of said individual panels being surrounded by a border portion of said panel which is incapable of displaying visual information, extends outwardly of said display zone, and has significant dimensions relative to the dimensions of said display zone of said panel, said display further comprising a fibre optic image transform construction arranged in front of the display panels for transforming an image collectively provided by the panels into a corresponding and continuous image in which the border discontinuity between adjacent panel display zones is substantially eliminated.

2. A display according to claim 1 wherein the fibre optic construction comprises a fibre optic plate and fibre optic guiding elements arranged to guide an image from panels arranged at an angle to the fibre optic plate.

3. A display according to claim 1 wherein the fibre optic construction includes fibre optic expander plates for expanding the display zones, each expander plate having optic fibres therein which extend in directions transverse to said panels, said fibres being arranged closer together at their ends nearest the panels than at their ends more remote from the panels.

4. A display according to claim 3 wherein at least part of the fibre optic construction comprises glass fibres.

5. A display according to claim 3 wherein at least part of the fibre optic construction comprises fibres of a plastic material.

6. A display according to claim 1 wherein the panels are electroluminescent display panels.

7. A display according to claim 1 wherein the panels are liquid crystal display panels.

8. A display of comparatively large size comprising a plurality of self-contained individual electrically addressable display panels arranged in a formation adapted to collectively provide a composite display of increased area, each of said display panels including a bordered periphery which is incapable of displaying visual information, and within that bordered periphery an addressable display zone capable of displaying visual information, the bordered periphery of each panel comprising a dead zone which extends outwardly of the display zone of said panel and has significant dimensions relative to the dimensions of said display zone of said panel, each of said display panels comprising an electrically responsive medium in the form of a layer filling the display zone of said panel, first and second sets of electrode structures respectively on opposite sides of the layer, cooperative with each other, and defining a multiplicity of electrically addressable display elements within the display zone of said panel, and connector means, disposed about the bordered periphery of said panel, cooperative with the first and second sets of the electrode structures for applying electrical address control to selected elements for defining visual information to be displayed by the display zone of said panel; and fibre optic image transform construction means arranged in front of said plurality of display panels, said transform construction means being in optical contact with the display zone of each of said panels and including a fibre optic plate defining a front display surface, arranged so that when the panels are addressed, discontinuities due to said bordered peripheries are substantially eliminated and a collective and continuous image is observed at said front display surface of said fibre optic plate.

* * * * *